(12) United States Patent
Fitzmaurice et al.

(10) Patent No.: US 7,554,541 B2
(45) Date of Patent: Jun. 30, 2009

(54) WIDGETS DISPLAYED AND OPERABLE ON A SURFACE OF A VOLUMETRIC DISPLAY ENCLOSURE

(75) Inventors: George William Fitzmaurice, Toronto (CA); Ravin Balakrishnan, Toronto (CA); Gordon Paul Kurtenbach, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 318 days.

(21) Appl. No.: 10/183,945

(22) Filed: Jun. 28, 2002

(65) Prior Publication Data

US 2004/0001111 A1  Jan. 1, 2004

(51) Int. Cl.
*G06T 17/00* (2006.01)
(52) U.S. Cl. .................................... 345/424
(58) Field of Classification Search ................ 345/424, 345/633, 848, 850, 852, 863, 782, 653, 665, 345/680, 650, 661, 676
See application file for complete search history.

(56) References Cited

U.S. PATENT DOCUMENTS

| | | | |
|---|---|---|---|
| 4,134,104 A | 1/1979 | Karras | |
| 4,160,973 A | 7/1979 | Berlin, Jr. | |
| 5,129,054 A * | 7/1992 | Alstad et al. | 715/766 |
| 5,134,390 A | 7/1992 | Kishimoto et al. | |
| 5,257,347 A * | 10/1993 | Busbridge et al. | 345/649 |
| 5,540,229 A * | 7/1996 | Collet-Billon et al. | 600/443 |
| 5,678,015 A | 10/1997 | Goh | |
| 5,717,415 A | 2/1998 | Iue et al. | |
| 5,767,854 A | 6/1998 | Anwar | |
| 5,805,137 A | 9/1998 | Yasutake | |
| 5,850,225 A * | 12/1998 | Cosman | 345/427 |
| 5,854,449 A | 12/1998 | Adkins | |
| 5,861,583 A | 1/1999 | Schediwy et al. | |
| 5,898,433 A | 4/1999 | Hijikata | |
| 5,959,614 A | 9/1999 | Ho | |
| 6,008,800 A | 12/1999 | Pryor | |
| 6,008,809 A | 12/1999 | Brooks | |

(Continued)

OTHER PUBLICATIONS

User Interfaces for Volumetric Displays. Balakrishnan et al. Computer. IEEE Computer Society Press. vol. 34 Issue 3. Mar. 2001. pp. 37-45.*

(Continued)

*Primary Examiner*—Peter-Anthony Pappas
(74) *Attorney, Agent, or Firm*—Staas & Halsey LLP (57) ABSTRACT

The present invention is a system that places 2D user interface widgets in optimal positions in a 3D volumetric display where they can be easily used based on the knowledge user have about traditional 2D display systems. The widgets are placed on a shell or outer edge surface of a volumetric display, in a ring around the outside bottom of the display, in a vertical or horizontal plane within the display and/or responsive to the users focus of attention. Virtual 2D widgets are mapped to volumetric voxels of the 3D display system. This mapping includes any mapping between a 2D representation or virtual display map of the widget to the corresponding voxels. For example, a 2D texture map of the widget image may be mapped into voxels. Control actions in the 3D volume initiated by conventional control devices, such as a mouse or a touch sensitive dome enclosure surface, are mapped to controls of the widgets and appropriate control functions are performed.

16 Claims, 5 Drawing Sheets

U.S. PATENT DOCUMENTS

| | | | |
|---|---|---|---|
| 6,031,519 A * | 2/2000 | O'Brien | 345/156 |
| 6,031,541 A | 2/2000 | Lipscomb et al. | |
| 6,049,317 A | 4/2000 | Thompson et al. | |
| 6,052,100 A | 4/2000 | Soltan et al. | |
| 6,064,423 A | 5/2000 | Geng | |
| 6,069,594 A | 5/2000 | Barnes et al. | |
| 6,100,862 A * | 8/2000 | Sullivan | 345/88 |
| 6,115,028 A | 9/2000 | Balakrishnan et al. | |
| 6,152,563 A * | 11/2000 | Hutchinson et al. | 351/209 |
| 6,208,318 B1 | 3/2001 | Anderson et al. | |
| 6,229,542 B1 | 5/2001 | Miller | |
| 6,271,847 B1 * | 8/2001 | Shum et al. | 345/418 |
| 6,512,498 B1 | 1/2003 | Favalora et al. | |
| 6,575,596 B2 | 6/2003 | Butt | |
| 6,577,330 B1 | 6/2003 | Tsuda et al. | |
| 6,597,358 B2 | 7/2003 | Miller | |
| 6,628,298 B1 | 9/2003 | Debevec | |
| 6,631,016 B1 * | 10/2003 | Klug et al. | 359/23 |
| 6,697,034 B2 | 2/2004 | Tashman | |
| 6,753,847 B2 | 6/2004 | Kurtenbach et al. | |
| 6,765,566 B1 | 7/2004 | Tsao | |
| 6,842,175 B1 | 1/2005 | Schmalstieg et al. | |
| 6,954,218 B2 | 10/2005 | Stall | |
| 2002/0008676 A1 | 1/2002 | Miyazaki et al. | |
| 2002/0033849 A1 * | 3/2002 | Loppini et al. | 345/848 |
| 2002/0135539 A1 | 9/2002 | Blundell | |
| 2003/0142136 A1 | 7/2003 | Carter et al. | |
| 2004/0145585 A1 | 7/2004 | Fontius | |
| 2004/0212605 A1 | 10/2004 | Fitzmaurice et al. | |
| 2005/0062684 A1 | 3/2005 | Geng | |

OTHER PUBLICATIONS

Foley et al. Computer Graphics: Principles and Practice. Addison-Wesley Publishing Company, Inc. 1997. p. 741-745.*
"Actuality Systems—Spatial 3D", URL http://www.actuality-systems.com/index.php/actuality/layout/set/print.
Gregg Favalora And Cameron Lewis, "Spatial 3D: The End of a Flat-Screen Thinking", Actuality Systems, Inc., Jul. 2003—First in a Series of Three Papers, pp. 1-9.
"User Interfaces for Volumetric Displays", Balakrishnan et al., Computer. IEEE Computer Society Press. vol. 34, Issue 3. Mar. 2001. pp. 37-45.
"A User Interface to a True 3-D Display Device", Hobbs et al., Proceedings of 5th Int'l Conference on Human-Computer Interaction, Aug. 1993, pp. 579-584.
"Multi-Finger Gestural Interaction with 3D Volumetric Displays", Grossman et al., UIST, ACM 2004, Oct. 2004, pp. 61-70.
The Rockin' Mouse: Integral 3D Manipulation on a Plane. Balakrishnan et al. Proceedings of 1997 ACM Conference on Human Factors in Computing Systems. 1997. pp. 311-318.
"An Exploration into Supporting Artwork Orientation in the User Interface", Fitzmaurice et al. Procceding of 1999 ACM Conference on Human Factors in Computer Systems. ACM Press, New York, 1999. pp. 167-174.
Mine. Virtual Environment Interaction Techniques. Technical Report. University of North Carolina at Chapel Hill. 1995.
Bowman et al., An Evaluation of Techniques for Grabbing and Manipulating Remote Objects in Immersive Virtual Environments. Proceedings of the 1997 Symposium on Interactive 3D Graphics. ACM Press. 1997.
Hinckley et al., A Survey of Design Issues in Spatial Input. Proceedings of the 7th Annual ACM Symposium on User Interface Software and Technology. ACM Press. 1994.
Grossman et al., Pointing at Trivariate Targets in 3D Environments. Proceedings of the SIGCHI Conference on Human Factors in Computing Systems. ACM Press 2004.
"Actuality Systems—Spatial 3D", URL http://www.actuality-systems.com/index.php/actuality/layout/set/print, 1999-2004.

W. Buxton and G.W. Fitzmaurice, "HMD's, Caves, and Chameleon: A Human-Centric Analysis of Interaction in Virtual Space," Computer Graphics, vol. 32, No. 4, 1998, pp. 64-68.
M. Czernuszenko et al., "The ImmersaDesk and Infinity Wall Projection-Based Virtual Reality Displays," Computer Graphics, vol. 31, No. 2, 1997, pp. 46-49.
D. Ebert et al., "Realizing 3D Visualization using Crossed-Beam Volumetric Displays," Comm. ACM, vol. 42, No. 8, 1999, pp. 101-107.
M. Lucente, "Interactive Three-Dimensional Holographic Displays: Seeing the Future in Depth," Computer Graphics, May 1997, pp. 63-67.
M. Sinclair, "The Haptic Lens," Proc. Siggraph 97, ACM Press, New York, 1997, p. 179.
T. Murakami and N. Nakajima, "Direct and Intuitive Input Device for 3D Shape Deformation," Proc. Computer- Human Interaction (CHI 94), ACM Press, New York, 1994, pp. 465-470.
R. Balakrishnan et al., "The Rockin' Mouse: Integral 3D Manipulation on a Plane," Proc. Computer-Human Interaction (CHI 97), ACM Press, New York, 1997, pp. 311-318.
G. Fitzmaurice, H. Ishii, and W. Buxton, "Bricks: Laying the Foundations for Graspable User Interfaces," Proc. Computer-Human Interaction (CHI 95), ACM Press, New York, 1995, pp. 442-449.
S. Zhai, W. Buxton, and P. Milgram, "The 'Silk Cursor': Investigating Transparency for 3D Target Acquisition," Proc. Computer-Human Interaction (CHI 94), ACM Press, New York, 1994, pp. 459-464.
B. Conner et al., "Three Dimensional Widgets," Computer Graphics, vol. 22, No. 4, 1992, pp. 121-129.
G. Fitzmaurice et al., "An Exploration into Supporting Artwork Orientation in the User Interface," Proc. Computer-Human Interaction (CHI 99), ACM Press, New York, 1999, pp. 167-174.
Ken-ichi Kameyama, et al., "Virtual Surgical Operation System Using Volume Scanning Display", Image Capture, Formatting, and Display, SPIE, vol. 2164, Medical Imaging 1994, pp. 146-154.
Michael Halle, "Autostereoscopic Displays and Computer Graphics", Computer Graphics, ACM SIGGRAPH, 31(2), May 1997, pp. 58-62.
Gregg Favalora et al., "Volumetric Three-Dimensional Display System with Rasterization Hardware", SPIE, vol. 4297A, Feb. 2001.
E. Sachs, A. Roberts and D. Stoops, "3-Draw: A Tool for the Conceptual Design of Three Dimensional Shape", IEEE Computer Graphics and Applications, Jan. 1990.
K. Kameyama and K. Ohtomi, "A Direct 3-D Shape Modeling System", IEEE, pp. 519-524, Sep. 1993.
J. Viega et al., "3D Magic Lenses", UIST 1996, Seattle, Washington, pp. 51-58.
K. Kameyama, K. Ohtomi and Y. Fukui, "Interactive Volume Scanning 3-D Display with an Optical Relay System and Multidimensional Input Devices", SPIE vol. 1915 Stereoscopic Displays and Applications IV (1993), pp. 12-20.
K. Kameyama and K. Ohtomi, "A Shape Modeling System with a Volume Scanning Display and Multisensory Input Device", Presence: vol. 2, No. 2, 1993, pp. 104-111.
K. Kameyama and K. Ohtomi, "VR System Using Volume Scanning Display and Multi-Dimensional Input Device", ISMCR, Nov. 1992, pp. 473-479.
K. Kameyama, K. Ohtomi and Yukio Fukui, "A Virtual Reality System Using a Volume Scanning 3D Display", 1991.
PCT International Search Report, PCT/US03/02341, filed Jan. 27, 2003, mailed Aug. 8, 2003.
U.S. Appl. No. 10/183,970, filed Jun. 28, 2002, Kurtenbach, et al., Silicon Graphics, Inc.
U.S. Appl. No. 10/183,966, filed Jun. 28, 2002, Kurtenbach, et al., Silicon Graphics, Inc.
U.S. Appl. No. 10/183,968, filed Jun. 28, 2002, Fitzmaurice, et al., Silicon Graphics, Inc.
U.S. Appl. No. 10/188,765, filed Jun. 28, 2002, Balakrishnan, et al., Silicon Graphics, Inc.
U.S. Appl. No. 10/183,944, filed Jun. 28, 2002, Balakrishnan, et al., Silicon Graphics, Inc.
R. Balakrishnan et al., "User Interfaces for Volumetric Displays", Mar. 2001, (IEEE).
Written Opinion, PCT IPEA, Dec. 11, 2003, 6 pp.

* cited by examiner

WIDGETS DISPLAYED AND OPERABLE ON A SURFACE OF A VOLUMETRIC DISPLAY ENCLOSURE

CROSS-REFERENCE TO RELATED APPLICATION(S)

This application is related to and claims priority to U.S. provisional application entitled User Interfaces For Volumetric Displays, having Ser. No. 60/350,952, by Kurtenbach et al, filed Jan. 25, 2002, this application is also related to U.S. application entitled Three Dimensional Volumetric Display Input And Output Configurations, having Ser. No. 10/183,970, by Kurtenbach et al, filed concurrently herewith, to U.S. application entitled Volume Management System For Volumetric Displays, having Ser. No. 10/183,966, by Kurtenbach et al, filed herewith, to U.S. application entitled Graphical User Interface Widgets Viewable And Readable From Multiple Viewpoints In A Volumetric Display, having Ser. No. 10/183,968, by Fitzmaurice et al, filed concurrently herewith, to U.S. application entitled A System For Physical Rotation of Volumetric Display Enclosures To Facilitate Viewing, having Ser. No. 10/188,765, by Balakrishnan et al, filed concurrently herewith, to U.S. application entitled Techniques For Pointing To Locations Within A Volumetric Display, having Ser. No. 10/188,944, by Balakrishnan et al, filed concurrently herewith and all of which are incorporated by reference herein.

BACKGROUND OF THE INVENTION

1. Field of the Invention

The present invention is directed to providing two-dimensional (2D) widgets in three-dimensional (3D) displays and, more particularly, to mapping a 2D widget into a volumetric display at a position where it can be easily used, such as on the outside surface of the volumetric display inside an enclosure for the display.

2. Description of the Related Art

A class of three-dimensional (3D) displays, called volumetric displays, is currently undergoing rapid advancement. The types of displays in this class include holographic displays, swept volume displays and static volume displays. Volumetric displays allow for 3D graphical scenes to be displayed within a true 3D volume. Such displays can take many shapes, globes, domes, cubes, etc. with a dome being a typical shape. Because the technology of these displays is undergoing rapid development those of skill in the art are concentrating on the engineering of the display itself. As a result, the man-machine interface to or the ways in which people interface with these types of displays is receiving scant attention.

While the volumetric displays allow a user to view different parts of a true 3D scene, the act of viewing the different parts typically requires that the user physically move around (or over) the display or that the display be moved or rotated in front of the user. As the display moves relative to the user, graphical user interface elements, sometimes called widgets may also move relative to the user. This is a particular problem when the widget is a two-dimensional (2D) interface, such as menu, a file tree, a virtual keyboard, or a display/view of a two dimensional document, such as a list or spreadsheet. Assuming that a volumetric display system needs to make use of these two-dimensional widgets, the question arises as to where to place these widgets to allow the user to interact with them.

A solution is to place the 2D widgets anywhere within the display. This can result in the intermingling of widgets and data, which may not be desirable. Additionally, complex 3D selection techniques may be needed if the 2D widget is placed in the 3D scene space to avoid selecting scene elements when the widget is intended.

What is needed is a system that will optimally place two-dimensional widgets on or in a volumetric display to allow direct and simple interaction.

SUMMARY OF THE INVENTION

It is an aspect of the present invention to provide a system that allows 2D widgets or graphical user interfaces to be used in a 3D volumetric display.

It is another aspect of the present invention to position widgets within a volumetric display at positions where they are useful for direct and simple interaction.

It is also an aspect of the present invention to provide 3D widgets in a volumetric display that can be used in much the same way 2D widgets are used in conventional 2D display systems.

It is an aspect of the present invention to place the widgets on an outside surface of a volumetric display inside a protective enclosure.

It is an aspect of the present invention to place the widgets on a surface within the volumetric display such as the "floor" of the display, back plane, or non-planar surface to be used in conventional 2D display systems.

The above aspects can be attained by a system that places user interface widgets in positions in a 3D volumetric display where they can be used with ease and directness. The widgets are placed on the shell or outer edge of a volumetric display, in a ring around the outside bottom of the display, in a plane within the display and/or at the users focus of attention. Virtual 2D widgets are mapped to volumetric display voxels and control actions in the 3D volume are mapped to controls of the widgets.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
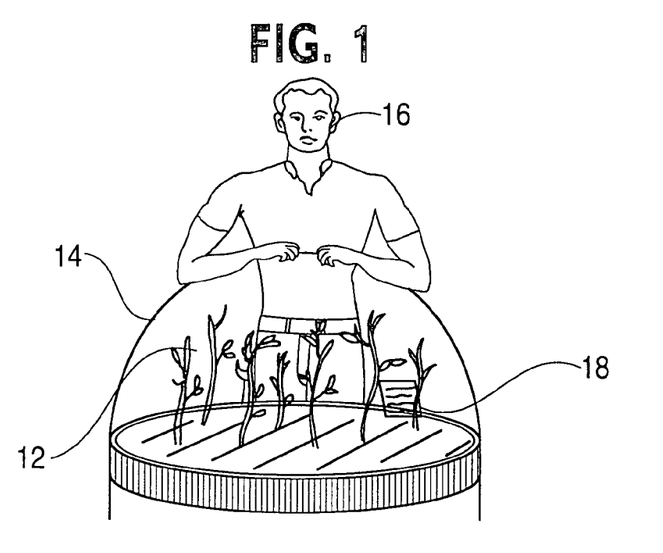
FIG. 1 depicts a volumetric display system.

Volumetric displays allow a user to have a true three-dimensional view of a scene 12 and are typically provided in the form of a dome 14, as depicted in FIG. 1. The user 16, as can be surmised from FIG. 1, move about the dome 14 to view different parts of the scene 12. From a particular viewpoint, a planar 2D widget 18 within the volumetric display and which may have icons, controls etc. within it can be in a position such that it is difficult to access by the user.

Figure 2:
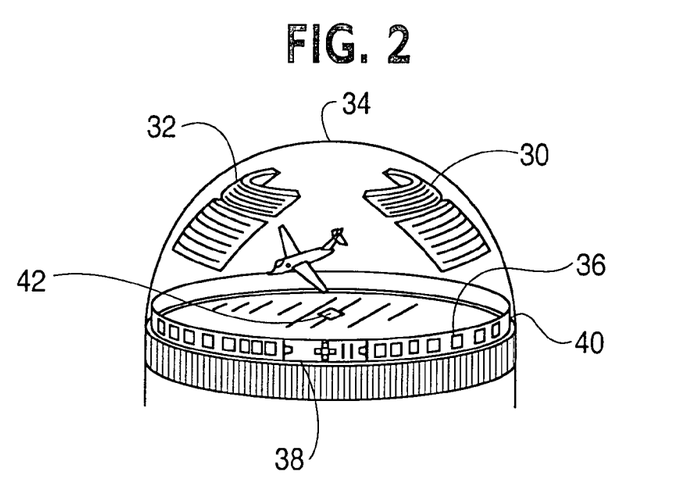
FIG. 2 illustrates alternatives in arranging 2D widgets with a volumetric display.
Figure 3:
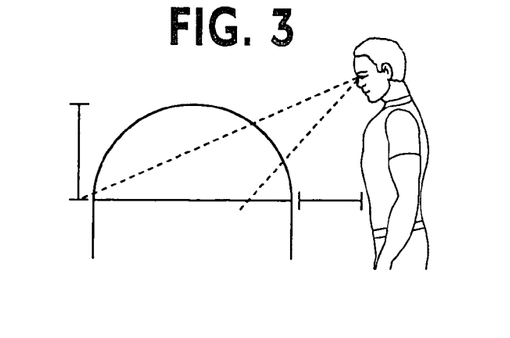
FIG. 3 shows a user's position and gaze range.

There are a number of different solutions to this problem. One solution is to place the 2D widgets 30 and 32 on the inside surface of the volumetric display enclosure 34, as depicted in FIG. 2; that is, reserve portions of the shell of the display for graphical user interfaces. Conventional pointing and manipulation techniques, such as touching a touch sensitive surface of the enclosure 34, can be used to interact with the widgets. The widgets also do not get mixed up with data or other data based graphics within the volumetric display. This type of widget positioning may require that the widgets be semitransparent so that the user can see the graphics within the display underneath or behind the widgets. Another alternative, which prevents the user's view of the display contents from being obscured by the widgets, is to place the widgets 36 and 38 in a ring 40 at the bottom of the display. A further alternative is to house the 2D widgets or GUI elements in a plane positioned in the display. FIG. 2 depicts a widget 42 housed in a horizontal plane positioned on a bottom of the display enclosure, or on the volumetric display system "desktop." The plane could also be positioned vertically or at an arbitrary angle depending on the needs of the user. Another alternative is to conventionally determine the users position and/or eye gaze, as depicted in FIG. 3, and position or arrange the 2D widgets within or outside the focus of attention as needed. For example, widgets that require the user's attention (i.e., Alert widgets) would appear at the center of the user's eye gaze and at the front of the volume display. Status information that is needed but not critical can appear on the peripheral of the users eye gaze perhaps surrounding the object that is the user's current focus of attention. Widgets can be placed in depth to assign priorities to them. For example, an Alert dialog box may be of a higher priority than another dialog box thus causing the Alert dialog box to be placed in front of the first dialog box and the first dialog box is "pushed back" in depth (stacked).

Figure 4:
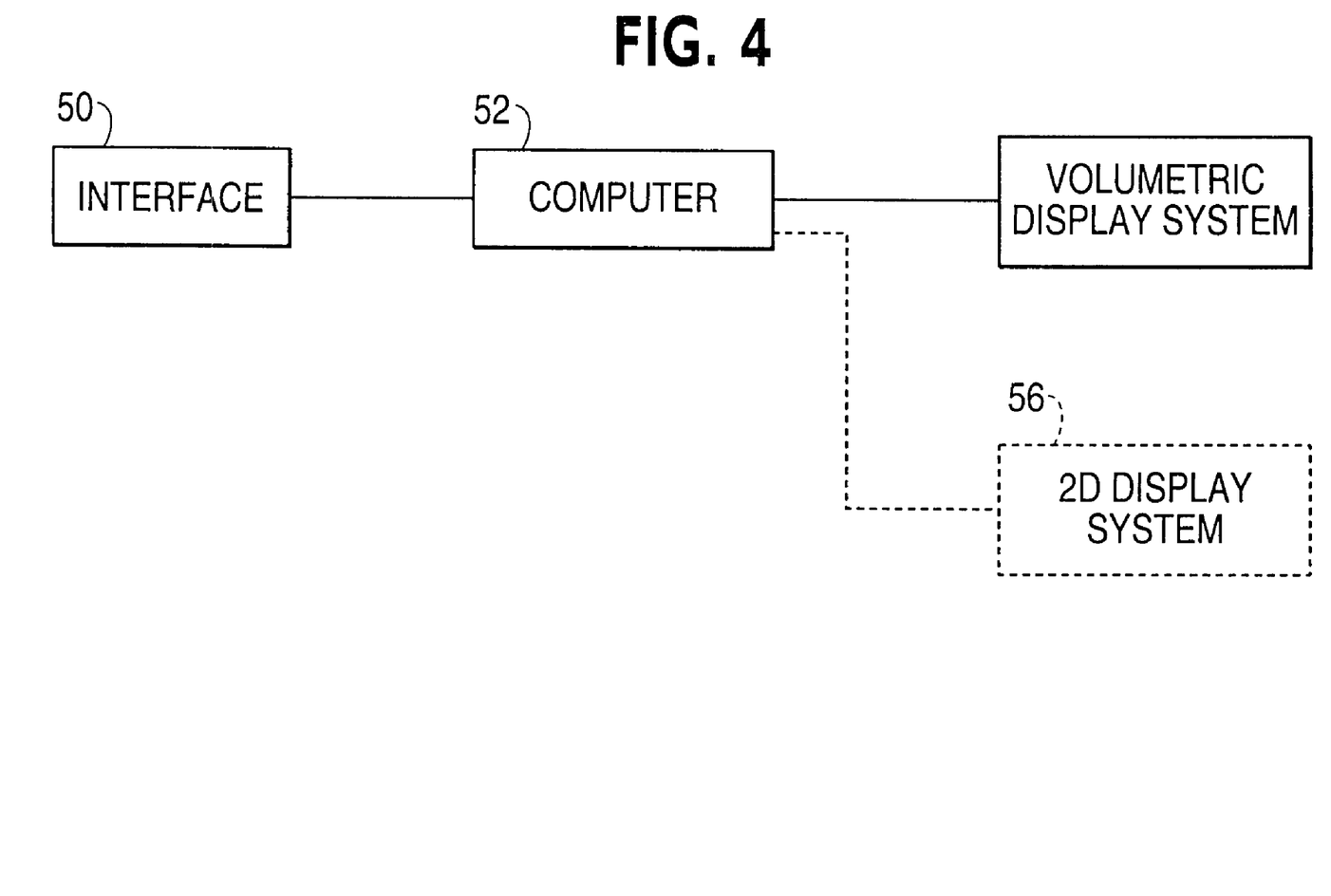
FIG. 4 depicts components of the present invention.

The present invention is typically embodied in a system as depicted in FIG. 4 where physical interface elements 50, such as a rotary dome position encoder, infrared user position detectors, a keyboard, touch sensitive dome enclosure surface, mouse, pointer, etc. are coupled to a computer 52, such as a server class machine. The computer 52 uses a graphical creation process, such as the animation package MAYA available from Alias|Wavefront, Inc., to create a three-dimensional (3D) scene including virtual interface elements, such as the two dimensional graphical user interface elements or widgets discussed herein. The display output, including the scene and widgets, is provided to a conventional volumetric display apparatus 54, such as one that will produce a 3D holographic display.

Figure 5A:
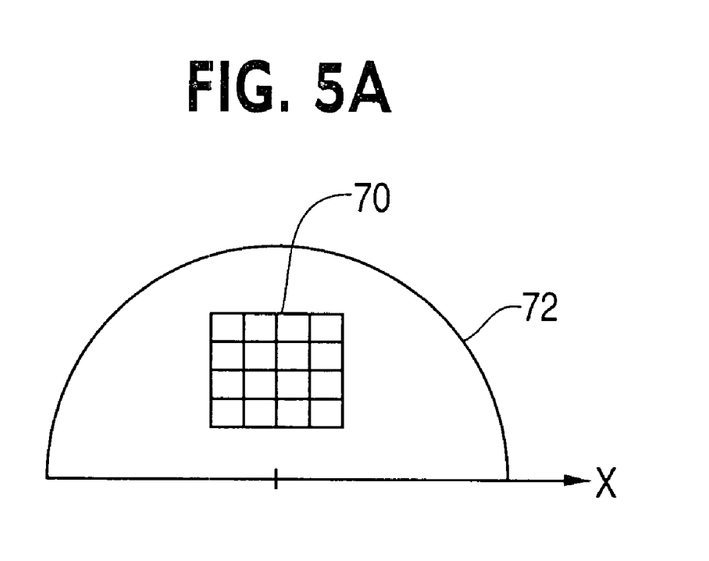
FIG. 5 illustrates the volumetric nature of voxels.
Figure 5B:
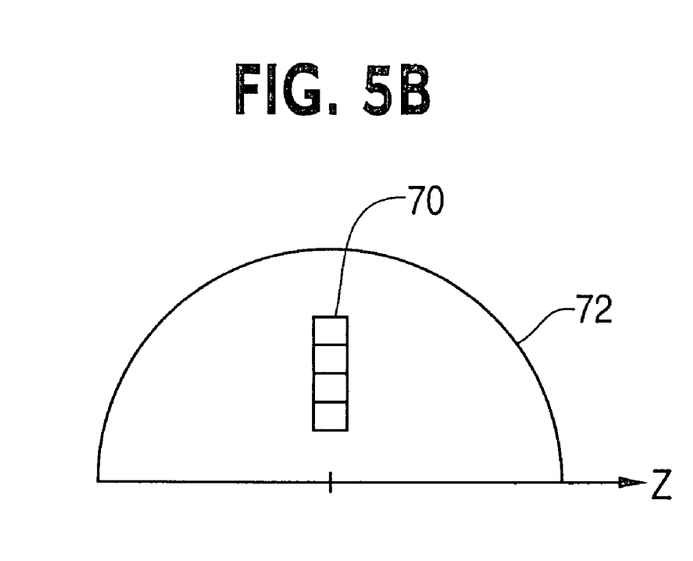
Figure 6A:
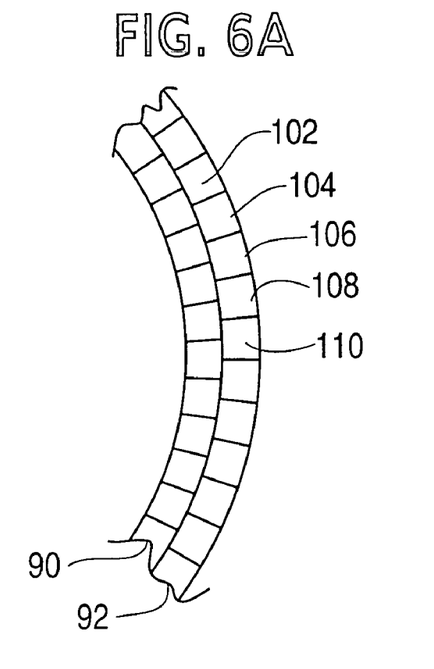
FIGS. 6A and 6b depict configurations of voxels within a display.
Figure 6B:
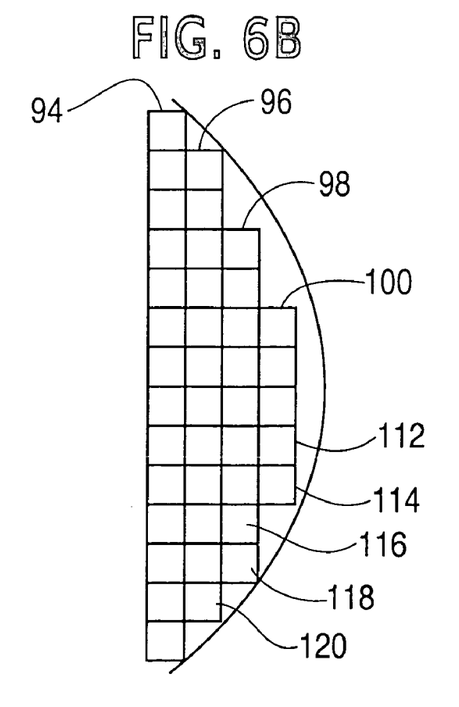

2D widgets can be represented within a computer system in a number of different ways. A typical way is to represent the widget as a two-dimensional display map of pixels that have a color value and possibly a control value associated with each of the two-dimensional positions within a virtual image area the widget typically occupies. In a 2D display system the widget is mapped from the virtual positions to actual display positions responsive to the position of the widget specified by the system. The system position is often controllable by the user, such as allowing a user to move a GUI to different places on a display with a point and drag type command or action. A volumetric display is comprised of voxels or volume pixels where each voxel has a 3D position as well as a voxel height, width and depth. FIGS. 5A and 5B depict a portion of a plane 70 of voxels from the front (5A) and side (5B) in a volumetric display 72. The positions of voxels within the display are typically determined with reference to a center of the display having the coordinates (0,0,0). The voxels within the display can be arranged in a number of different ways as depicted in FIGS. 6A and 6B where FIG. 6A shows concentric layers 90 and 92 of voxels and FIG. 6B shows rectilinearly stacked layers 94, 96, 98 and 100 of voxels. In these examples voxels 102, 104, 106, 108 and 110 and voxels 112, 114, 116, 118 and 120 are surface voxels that might be used for part of a 2D widget displayed on the outside surface of the display inside the enclosure. Note that the programming interface to a volumetric display may have abstractions in which the 3D display space is defined as a collection of voxels that are discrete, cubically shaped, and individually addressable sub-portions of the display space. However, the display software may translate these discrete voxels into a continuous representation that is more compatible with the display rendering hardware.

In displaying a 2D widget within a volumetric display the pixels of the virtual image must be mapped to corresponding voxels. This can be accomplished by a mapping between the 2D virtual representation and a "layer" of voxels in an appropriate location in the display, such as on the "surface" of the display. For example, a control portion of a 2D widget, such as part of a trashcan icon, might be mapped to the voxels 112-120 in FIG. 6B. In the best scenario the mapping of the 2D widget to the voxels is performed continuously or is updated at the rate of the refresh rate of the volumetric display. These mapping operations are shown in FIG. 7.

The voxels used for display need not be limited to displaying a widget. One or more widgets can be displayed in a plane. In fact, the entire 2D desktop work space typically presented to a user on a display, such as a CRT or LCD, can be converted into a three-dimensional plane. The plane can be at the bottom of the volumetric display or at any desired angle or position within the volumetric display. The workspace can also be divided among several planes with different windows/icons/controls tiled or cascaded.

Figure 7:
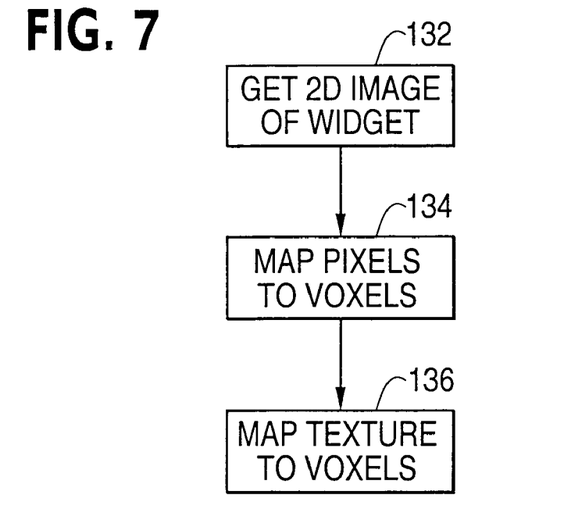
FIG. 7 depicts mapping from a 2D virtual representation of a widget to a volumetric voxel version of the widget.

The mapping of the virtual representation of the widget, as depicted in FIG. 7, starts with obtaining 132 the pixel based image of the 2D widget, which is essentially a 2D window pixel map of a portion of a 2D desktop. For the workspace, the 2D representation of the entire workspace is obtained. The pixels of the shape of the widget are then mapped 134 to the voxels of the display where the voxels are typically offset from the center of the display such that an x coordinate of the 2D pixels maps to a 3D voxel at x+(x offset), the y coordinate of the 2D pixel maps to the 3D voxel at y+(y offset) and the z coordinate of the voxel is 0+(z offset). This can create a widget that has a 3D surface or a volume. Note that scaling may occur in this mapping such that the widget is either made "larger" or "smaller" as compared to the virtual map. Because the mapping can be from a linear "plane" in which the 2D widget is represented to voxels that may form a curved surface, the mapping uses conventional coordinate translation techniques to determine the effects for each voxel to allow the 2D widget to be curved in the volumetric display space. This mapping is appropriate particularly for displays with voxels arranged as depicted in FIG. 6B. Next the texture of the 2D interface is mapped 136 to the 3D surface of user interface. In performing this mapping, the interface typically takes precedence over other display values of the voxels that may have been set by the scene of the display. That is, if the user activates a control that pulls down a menu, if the position of the menu coincides with a scene element, such as a 3D graphic of a house, the pull down menu overwrites the scene values. It is also possible to combine the values of the scene and user interface in some way, such as by averaging the scene and interface values, so that both are visible, though this is not preferred.

The widgets can also be texture mapped. In general, the texture mapping procedure includes first having the system determine whether each voxel in the display intersects a surface of the 3D widget. If it does, the system maps the voxel position into a (u,v) local surface position of a texture map for the widget. Using the local surface position, the system samples the texture map for the widget surface. The value of the sample is then assigned to the voxel. When the 3D widget is more than one voxel deep, and depending on the surface intersected, the mapping may sample a front, back or side texture for the widget. The present inventions obtains the texture information from a single, 2D texture map of the original 2D widget. That is, only one texture map of the 2D widget is needed to translate it into voxel space.

Additional 3D characteristics can be obtained from the 2D widgets. For example, shading is commonly used on 2D widgets to give the visual impression of depth. A 3D surface for a widget is derived by analyzing this shading information such that these shaded 2D widgets would actually have true depth in the 3D display. Also pseudo-2D widget behavior is realized as real 3D behavior in the 3D volume. For example, depressing a push button widget actually moves the button in depth in the 3D display. Another aspect about giving 2D widgets volume is rather than synthesizing the depth aspect of a widget, it is simply determined by convention. For example, the convention could be to surround each 2D widget or collection of 2D widgets in the 3D display with a 3D widget "frame" which would give the edge of the widget thickness and thus make viewing and accessing from extreme angles easier. An example of this is that the frame of a 2D window automatically is given thickness in 3D volumetric displays. As a result, the texture of the widget takes on the shape of the surface of the widget. Because the surface can be enlarged or otherwise changed in configuration during the mapping, the texture mapping may use conventional processes to stretch or morph the texture for the surface. Because the mapping of a widget may map from a linear shape to a curved shape associated with the surface of a dome, conventional processes are also used to warp or morph the widget shape and/or texture into the desired shape, such as to make a curved edge of a menu window appear straight in a polar type coordinate system.

Figure 8:
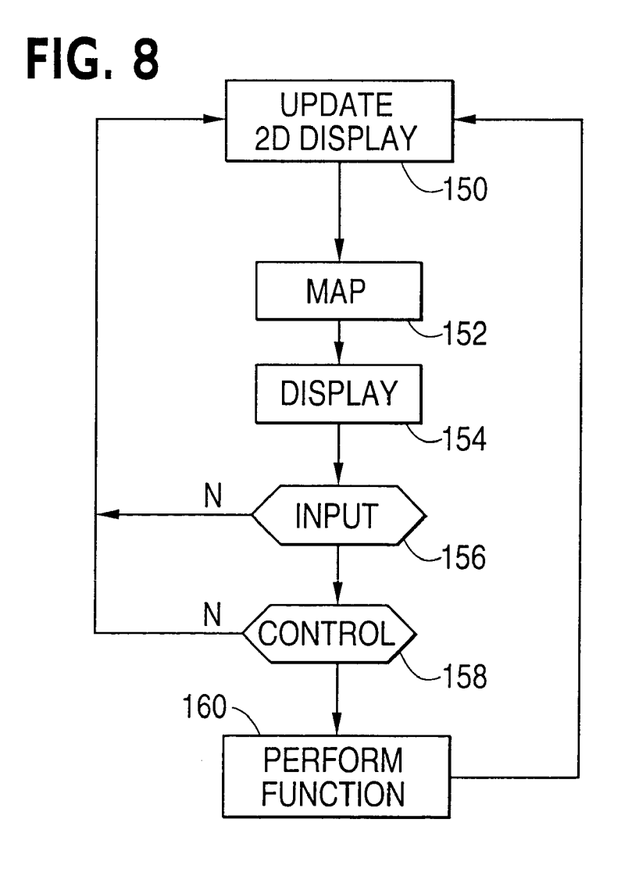
FIG. 8 shows the operations involved in interacting with the widget.

Once the 2D widget is initially mapped into the display, the widget is ready for use or interaction with the users. This interaction occurs within the operations associated with creating and projecting a scene within the volumetric display. That is, the GUI operations may be at the beginning or end of a scene projection operation or in the middle based on an interrupt. As depicted in FIG. 8, the operations form a loop in which the 2D virtual display is updated 150. This update may occur because the user has activated a pull down menu in the display, the system has moved the display because of a spatial conflict or a cursor/pointer has been moved into the display by the user to make a control selection or for a number of other reasons. The update occurs as previously discussed with respect to FIG. 7. The updated display is mapped 152 to the desired position and voxels within the volumetric display and the voxel data is output 154 to the volumetric display system. The determination is made as to whether a control type input has been input 156, such as by the user positioning a pointer at a 3D position in or over the widget and activating a selection device, such as a button of a mouse or a touch sensitive portion of the display enclosure. If a control type input has been input, the system determines 158 whether the pointer lies within or the touched part of the enclosure lies over a control portion of the 2D display. This is accomplished by essentially comparing the coordinates of the pointer or the coordinates of the touch to the coordinates of the control specified in the virtual map of the 2D widget. This involves mapping or performing a coordinate system translation of the voxel coordinates of the pointer position in display space to the corresponding coordinates in the 2D widget map space when a pointer is used. For a touch, the touch position is translated to the nearest voxels along a surface normal of the display enclosure and then the voxels so selected are mapped as noted above. If a control has been selected and activated, the system performs 160 the function of the control.

The discussion above considered a single type of control such as a button being activated. For more complex controls, such as a slider, the loop of FIG. 8 would include the conventional processes associated with complex 2D controls that govern widget behavior. In a slider off axis movements, such a touch that is perpendicular to slider orientation, are ignored but continued contact during a touch sliding operation keeps the slide function active. These types of more complex functions can be supplied by one of ordinary skill in the art. The particular policies concerning when and how to constrain input depend on the type of control involved.

The present invention has been described with respect to taking a 2D representation of a widget and mapping its texture representation into a 3D widget that has volume. It is also possible to construct 3D widget representations, such as a 3D slider, and map them more directly. The present invention has been described with respect to activating a control associated with a cursor or pointer intersecting a voxel corresponding to a control by ray-casting the pointer of the center of the display and selecting a first control that has voxels intersected by the ray. The control discussed herein has been active controls in which the user activates the control. Other types of controls can also be involved, such a dwell controls which are typically used to display help information in a "bubble". The input discussed herein has included pointing inputs. However, the input can be text from a keyboard that is entered in a window of a widget.

Note that translating a 2D widget to the 3D volumetic display may not require the use of texture maps. Instead, the volumetric-based widget can be reconstituted/created using a core set of drawing primitives library (such as drawline, fill rectangle, draw text) that has been tailored to work on the volumetric display.

As a consequence of the present invention of translating a conventional 2D widget into a volumetric-based widget through the use of texture mapping procedures, the procedures can be reversed to translate or collapse volumetric-based widgets into a 2D widget representation.

The present invention also includes a hybrid display system including a volumetric display 54 and conventional 2D displays 56, such as LCD or CRT screens (see FIG. 4). One style of a hybrid display has a spherical-shaped volumetric display (FIG. 1) with a traditional LCD display mounted and viewable as the floor of the display replacing or in addition to widget display 42 of FIG. 2. Here the 2D widgets may reside on the LCD display—which also serves as part of the display enclosure. Similarly, small touch-sensitive LCD panels may be arranged along the base rim of the spherically shaped or cubically-shaped volumetric display and serve as a displayable exterior surface on the enclosure replacing or in addition to widget display 38 of FIG. 2. One additional example is a hybrid configuration in which images are projected onto the volumetric enclosure using a traditional digital projector (often used to project computer displays onto large screens for presentations). While the 2D widgets may be presented on these traditional 2D displays serving as part of the volumetric enclosure, software libraries and infrastructure treats these display spaces as separate logical displays and separately addressable or as part of the single, logical voxel space of the volumetric display.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A process, comprising:
    generating and displaying a volumetric display having a physically curved exterior surface portion;
    producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible; and
    allowing a user to operate the two-dimensional graphical user interface by determining whether a control of the interface has been activated by mapping a user controlled pointer position capable of being located anywhere in the volumetric display to a two-dimensional interface virtual map.

2. A process as recited in claim 1, wherein the producing comprises positioning the user interface on an outermost edge of the volumetric display within the volumetric display.

3. A process as recited in claim 1, wherein the producing comprises positioning the interface responsive to a users eye gaze.

4. A process as recited in claim 3, wherein the producing comprises positioning the interface responsive to a users focus of attention.

5. A process as recited in claim 1, wherein the producing comprises mapping a 2D interface representation into a 3D interface in the display.

6. A process as recited in claim 1, wherein the producing comprises drawing the interface in three dimensions using three-dimensional drawing primitives 7. A process, comprising:
    generating and displaying a volumetric display having a physically curved exterior surface portion;
    producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible; and
    allowing a user to operate the two-dimensional graphical user interface by determining whether a control of the interface has been activated by mapping a user controlled pointer position in the volumetric display to a two-dimensional interface virtual map,
    wherein the producing comprises mapping a 2D interface representation into a 3D interface in the display, and
    wherein the producing comprises mapping a two-dimensional interface representation to voxels in the volumetric display.

8. A process as recited in claim 7, wherein the mapping comprises assigning 2D texture of the interface to each voxel.

9. A process as recited in claim 8, wherein when the interface has a thickness of more than one voxel, the assigning comprises:
    determining whether a voxel intersects a 3D interface surface;
    mapping the 2D texture when an intersection occurs comprising:
        mapping the intersecting voxel to a user interface texture map local surface position;
        sampling texture of the texture map at the local surface position; and
        assigning the texture of the sample to the voxel.

10. A process as recited in claim 7, further comprising mapping control inputs of the volumetric display to controls of the representation.

11. A process, comprising:
    generating and displaying a volumetric display having a physically curved exterior surface portion;
    producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible, and mapping control inputs of the volumetric display to controls of the interface; and
    allowing a user to operate the two-dimensional graphical user interface by determining whether a control of the interface has been activated by mapping a user controlled pointer position in the volumetric display to a two-dimensional interface virtual map.

12. A process, comprising:
    generating and displaying a volumetric display having a physically curved exterior surface portion;
    producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible, comprising:

mapping a two-dimensional interface representation to voxels in the volumetric display where the interface has a thickness of more than one voxel producing an interface having a physical three-dimensional volume;

assigning 2D texture of the interface to each voxel, the assigning comprising:
   determining whether a voxel intersects a 3D interface surface; and
   mapping the 2D texture when an intersection occurs comprising:
      mapping the intersecting voxel to a user interface texture map local surface position;
      sampling texture of the texture map at the local surface position;
      assigning the texture of the sample to the voxel; and mapping control inputs of the volumetric display to controls of the representation; and allowing a user to operate the two-dimensional graphical user interface by determining whether a control of the interface has been activated by mapping a user controlled pointer position in the volumetric display to a two-dimensional interface virtual map.

13. An apparatus, comprising:

a volumetric display system for generating and displaying a physical three-dimensional volumetric scene and having a cursed exterior surface portion;

an input system inputting a three-dimensional control input for a user interface; and a computer system receiving the control input for the user interface, mapping a two-dimensional representation of the interface to voxels within the display system producing an interface having a physical three-dimensional volume which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible and mapping the three-dimensional control input to the two-dimensional representation, and allowing a user to operate the two-dimensional graphical user interface by determining whether a control of the interface has been activated by mapping a user controlled pointer position in the volumetric display to a two-dimensional interface virtual map.

14. A computer readable storage encoded with a computer program for controlling a computer by a process, the program comprising:

generating and displaying a volumetric display having a physically curved exterior surface portion and producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible and determining whether a control of the interface has been activated by mapping a user controlled pointer position in the volumetric display to a two-dimensional interface virtual map and allowing a user to operate the two-dimensional graphical user interface.

15. A process, comprising:

generating and displaying a volumetric display having a physically curved exterior surface portion;

producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible; and allowing a user to operate the two-dimensional graphical user interface by determining whether a control of the interface has been activated by mapping a user controlled voxel pointer position coordinates in the volumetric display to coordinate positions of a two-dimensional interface virtual map when a selection device has been activated.

16. A process, comprising:

generating and displaying a volumetric display having a physically curved exterior surface portion;

producing a two-dimensional graphical user interface having a physical three-dimensional volume within the volumetric display and which, when positioned in association with the curved exterior surface portion, is produced to physically and visibly conform to the curved exterior surface portion, such that the conformed physical volume is physically curved within the three-dimensional volume, while maintaining its shape simultaneously from any plurality of different points of view outside the volumetric display where the interface is visible; and allowing a user to interact with the two-dimensional graphical user interface to activate the control by mapping a user controlled voxel pointer position in the volumetric display to a two-dimensional interface virtual map for the control when a selection device indicating a control operation has been activated.

* * * * *

UNITED STATES PATENT AND TRADEMARK OFFICE
CERTIFICATE OF CORRECTION

PATENT NO.         : 7,554,541 B2
APPLICATION NO.    : 10/183945
DATED              : June 30, 2009
INVENTOR(S)        : George W. Fitzmaurice et al.

Page 1 of 1

It is certified that error appears in the above-identified patent and that said Letters Patent is hereby corrected as shown below:

Title Page 2, Column 1 (Other Publications), Line 20, change "Procceding" to --Proceeding--.

Column 6, Line 41, change "volumetic" to --volumetric--.

Column 7, Line 58, change "primitives" to --primitives.--.

Column 8, Lines 19-20, change "voxel, the assigning comprising:" to --voxel the assigning comprises:--.

Signed and Sealed this

Third Day of November, 2009

David J. Kappos
*Director of the United States Patent and Trademark Office*